Figure 1:
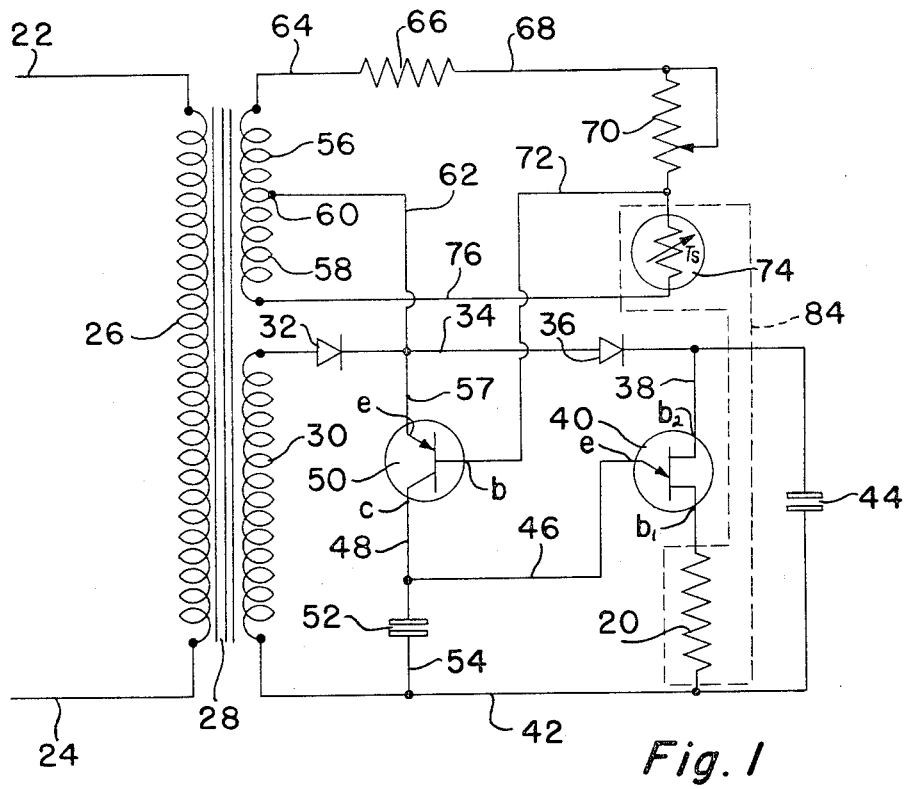

Oct. 22, 1968  A. B. ROBY  3,407,286
ELECTRONIC CONTROL WITH UNIJUNCTION TRANSISTOR
Filed May 12, 1966  4 Sheets-Sheet 1

- - - - - - %Bridge Unbalance
— · — · — %Heater Power
———— Temp. Within Enclosure INVENTOR.
Alfred B. Roby
BY Carla Stickel
His Attorney INVENTOR.
Alfred B. Roby
BY
His Attorney Oct. 22, 1968 A. B. ROBY 3,407,286
ELECTRONIC CONTROL WITH UNIJUNCTION TRANSISTOR
Filed May 12, 1966 4 Sheets-Sheet 3

INVENTOR.
Alfred B. Roby
BY
Carl A. Stickel
His Attorney

INVENTOR.
Alfred B. Roby
BY Carl A. Stickel
His Attorney

United States Patent Office 3,407,286
Patented Oct. 22, 1968

3,407,286
ELECTRONIC CONTROL WITH UNIJUNCTION TRANSISTOR
Alfred B. Roby, West Alexandria, Ohio, assignor to General Motors Corporation, Detroit, Mich., a corporation of Delaware
Filed May 12, 1966, Ser. No. 549,575
9 Claims. (Cl. 219—501)

This invention pertains to the control of electrical loads and particularly to controlling electric heaters according to temperature variations with a minimum of radio interference.

Although many temperature controls have been devised for various kinds of heaters, their reliability has often been questioned particularly by the uninformed. Many temperature control systems also cause radio interference and are slow to reach the selected temperatures. Many are too complicated and expensive for widespread use and the more simple types tend to overshoot excessively and fail to maintain accurately the temperature desired under all conditions.

It is an object of this invention to provide a simple electronic control system capable of operating indefinitely and which generates substantially no radio interference and rapidly attains and accurately maintains the temperature desired.

It is another object of this invention to provide a simple electronic control system which is improved and simplified and minimizes radio interference by turning on and off at a low rate, the current flow under the control of a unijunction transistor.

It is another object of this invention to provide a simple electronic control system in which various selected temperatures are rapidly attained and accurately maintained with a minimum of overshoot by suitably controlling a unijunction transistor to trigger current flow.

These and other objects are attained in the form shown in the drawings in which a unijunction transistor has one of its base terminals connected in series with a load or electrical devices for controlling a load. The circuit is provided with a pulsing direct current supply in which the ripple is reduced to a small amount through the use of a capacitor connected in shunt with the transistor and its load or load controlling device. The emitter of the unijunction transistor is connected between the capacitor and a current control device in a circuit connected in parallel with the previously mentioned capacitor. A change in resistance of the control device from low to high will change the frequency of current pulses through the emitter and the load from 100% to zero on time. The control device comprises an adjustable resistance or a bridge circuit containing an adjustable resistance, a transistor and a temperature sensor in the form of a temperature responsive resistance which is responsive to the temperature effect of the load if the load is an electric heater. If the load is large, a load controlling device such as a relay or electronic control of a solid state switch such as one of the forms of thyristors may be used to control the large load. The term "thyristor" is used according to I.E.C. terminology.

Further objects and advantages of the present invention will be apparent from the following description, reference being had to the accompanying drawings wherein preferred embodiments of the present invention are clearly shown.

Figure 2:
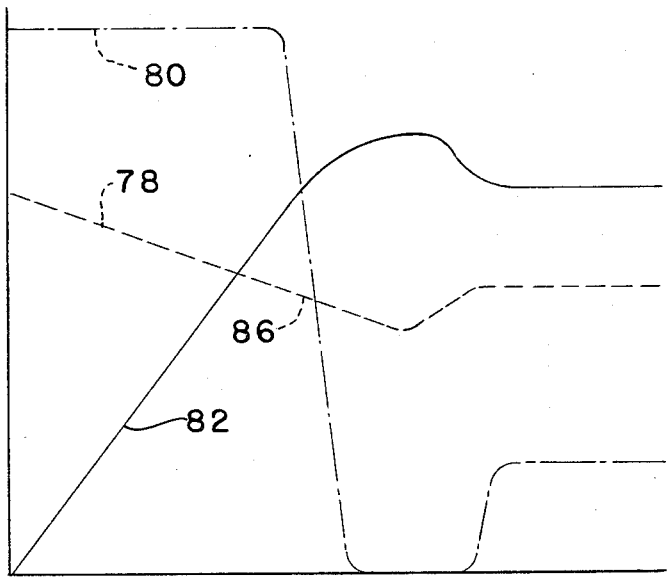
Figure 3:
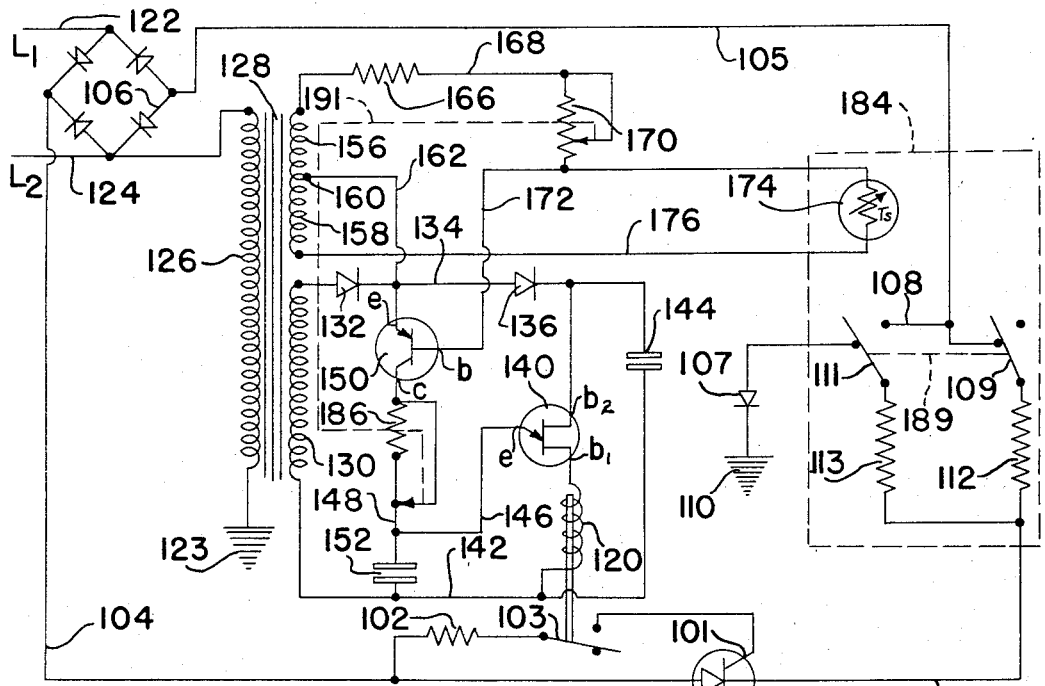
Figure 4:
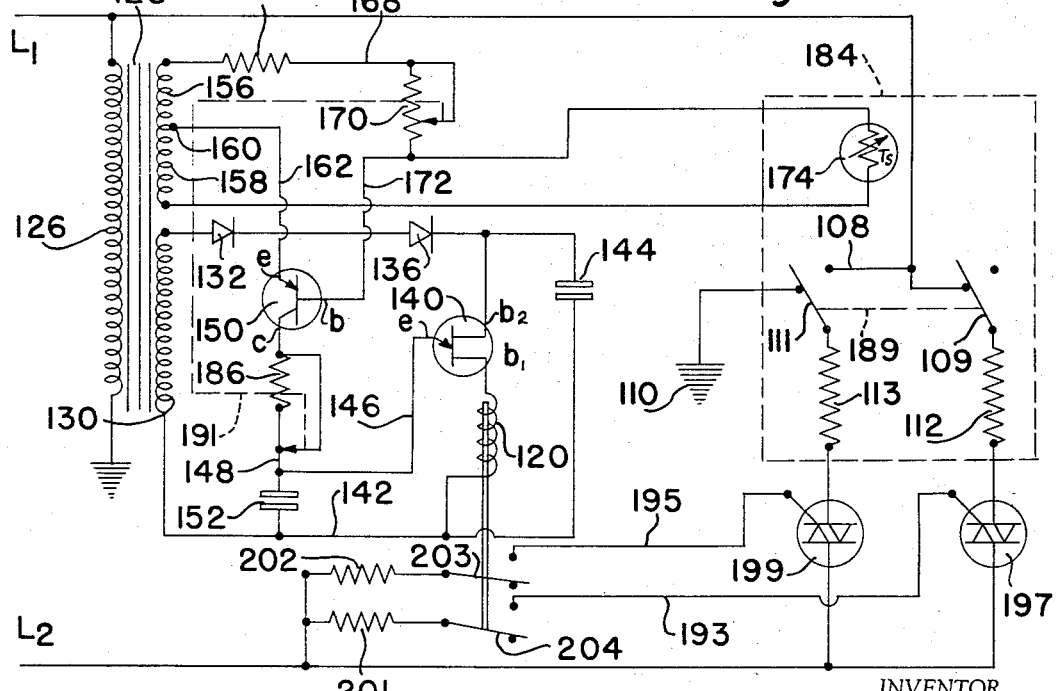
Figure 5:
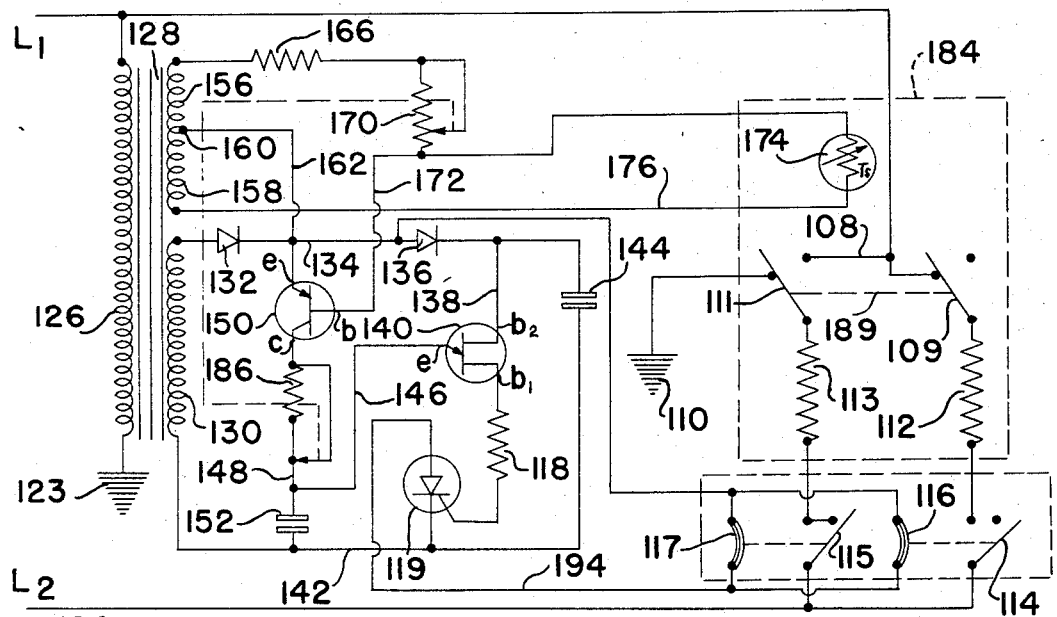
Figure 6:
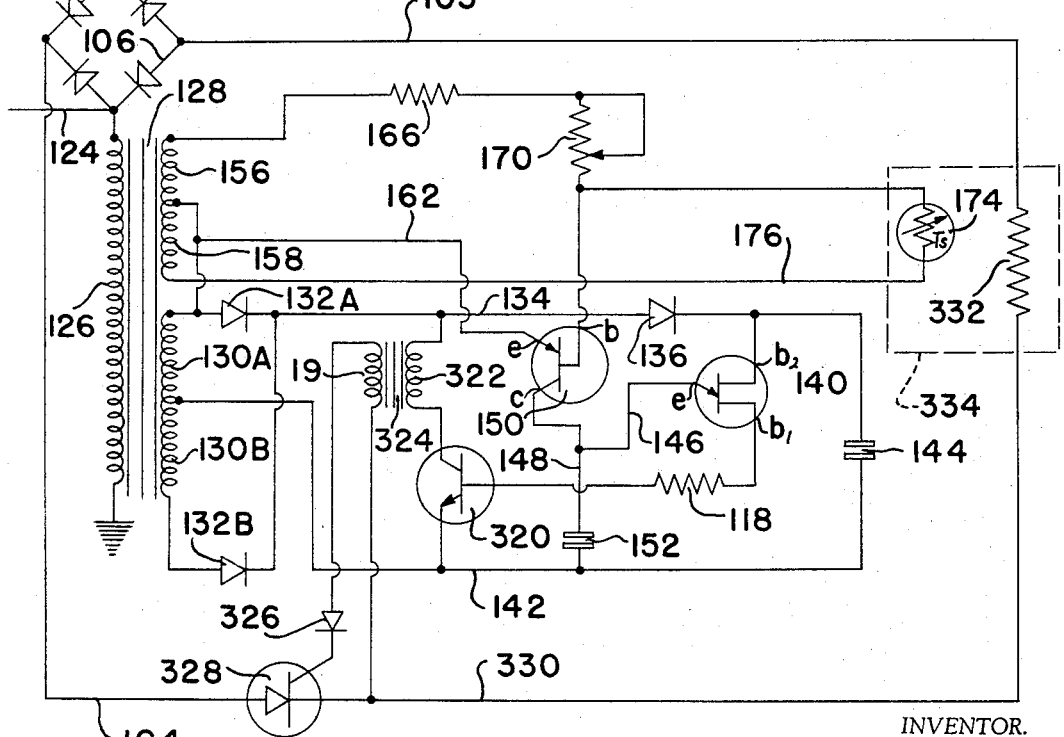
Figure 7:
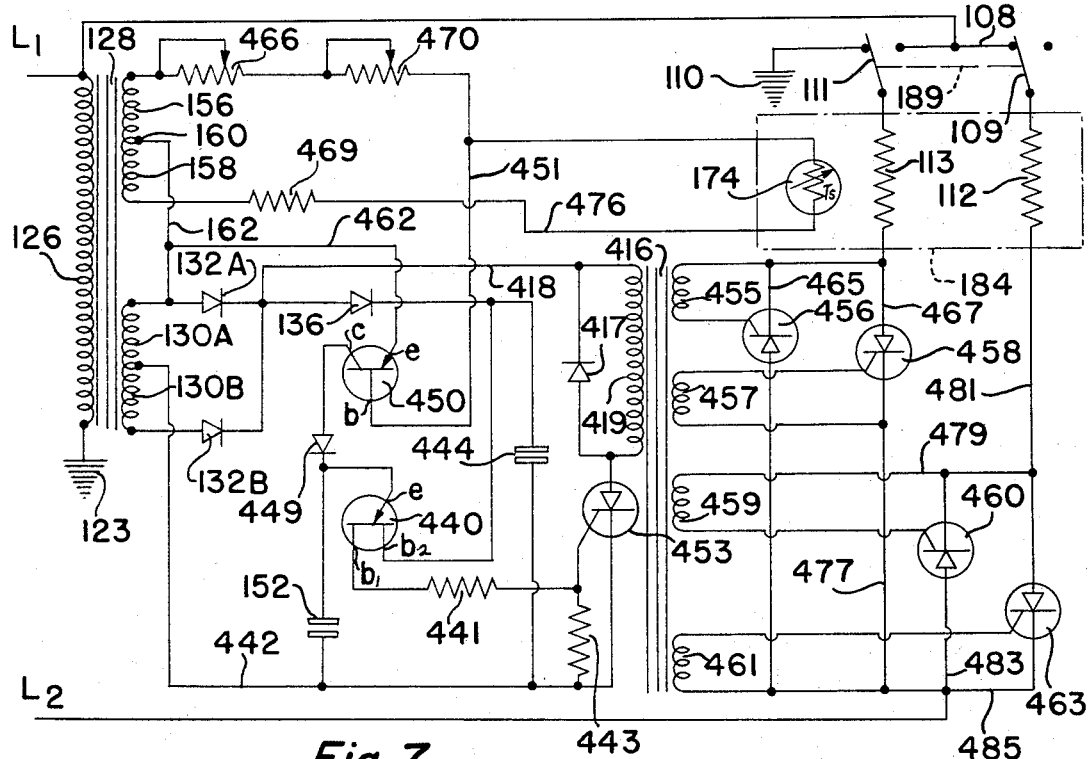
Figures 8, 10, 11:
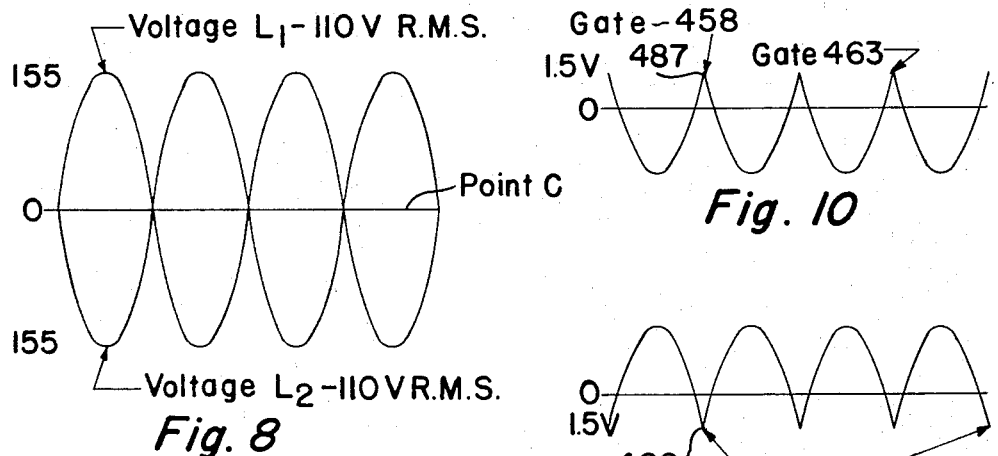
Figure 9:
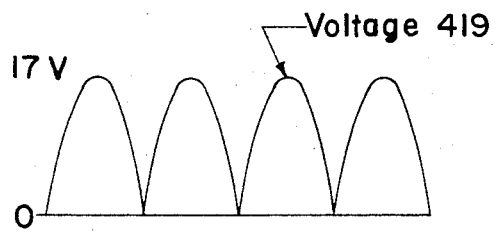

In the drawings:
FIGURE 1 is a wiring diagram illustrating one form of my invention;
FIGURE 2 is a graph in which the bridge unbalance, percentage of heater power and percentage of maximum temperature are plotted against elapsed time;
FIGURE 3 is a wiring diagram in which a silicon controlled rectifier thyristor is used to control a larger load;
FIGURE 4 is a wiring diagram similar to FIGURE 3 in which two triac thyristors are used to control a larger load;
FIGURE 5 is a wiring diagram similar to FIGURES 3 and 4 in which a silicon controlled rectifier thyristor is used to control a set or relays for controlling a larger load;
FIGURE 6 is a wiring diagram similar to FIGURES 3-5 in which a transistor, a transformer and a silicon controlled rectifier thyristor are used to control a larger load;
FIGURE 7 is a wiring diagram similar to FIGURES 3-6 in which two silicon controlled rectifier thyristors are provided for controlling a larger load;
FIGURE 8 is a voltage-time graph of the voltage across the two supply conductors and the ground of FIGURE 7;
FIGURE 9 is a graph of the rectified transformer input voltage;
FIGURE 10 is a graph of the gate to cathode voltage of one set of silicon controlled rectifier thyristors; and,
FIGURE 11 is a graph of the gate to cathode voltage of remaining set of silicon controlled rectifier thyristors.

Referring now to the drawings and more particularly to FIGURE 1, there is illustrated a wiring diagram for a small electrical load 20. This load is embodied in a circuit which may be supplied from a 115 volt power supply having supply conductors 22 and 24 connecting with the input winding 26 of a step down transformer 28. The transformer 28 has a 12 volt output winding 30 having one terminal connected through the diode rectifier 32, the conductor 34, the diode rectifier 36 and the conductor 38, with the base terminal $b-2$ of a unijunction transistor 40. The opposite base terminal $b-1$ of the transistor 40 is connected to the upper terminal of the electrical load 20 which may be an electric heater or a load controlling device. The lower terminal of the electric heater 20 is connected by the conductor 42 to the lower terminal of the output winding 30. When the transformer 28 is supplied with 115 volt A.C. current, a pulsing direct current is applied to the transistor 50. A capacitor 44 large enough to reduce the ripple to 5–20% of the applied voltage, is connected in shunt with both the unijunction transistor 40 and the load 20 and connects with the conductors 38 and 42.

The emitter terminal $e$, of the unijunction transistor 40 is connected by the conductor 46 to the conductor 48 connecting the collector $c$, of the transistor 50 with one terminal of the capacitor 52 which has its other terminal connected by the conductor 54 to the conductor 42. The transistor 50 has its emitter terminal $e$, connected by the conductor 57 to the conductor 34.

The transistor 50 is controlled by a bridge circuit supplied with energy from a tapped step down transformer winding having coils 56 and 58. The central tap 60 between the coils 56 and 58 is connected by the conductor 62 to the conductor 34. The one leg of the bridge includes the winding 56, the conductor 64, a fixed resistance 66, the conductor 68 and a variable conductor control resistance 70 which joins the conductor 72 connecting with the base terminal $b$, of the transistor 50. Also, connecting with the conductor 72 is a temperature sensor in the form of a positive temperature responsive resistance 74 connecting through the conductor 76 to the lower terminal of the coil 58 to form the second leg of the bridge circuit. The base and emitter of the transistor 50 are connected across the legs of the bridge when the bridge is unbalanced so that to apply a positive voltage from emitter to base to reduce the resistance between the emitter and the collector, the capacior 52 will be charged to a voltage high enough to cause the unijunction transistor 40 to fire. The voltage charge upon the capacitor 52 required to fire the transistor 40, varies with the inherent characteristics of the unijunction transistor selected and particularly depends upon the intrinsic stand-off ratio thereof which may vary between 47 and 80 percent of the voltage applied across the base terminals thereof. The firing of the transistor 40 and the energization of the load 20 will therefore depend upon the adjustment of the restrictor 70 and the temperature of the temperature responsive resistance 74 which will determine the balance or unbalance of the bridge circuit.

When the temperature responsive resistance 74 is used to control an electric heater such as the heater 20 within the dash line enclosure 84, the temperature to be maintined is selected by the adjustment of the variable resistance 70. When the temperature responsive resistance 74 is subjected to a colder ambient temperature within the enclosure 84 than the setting of the variable resistance 70, a relatively large unbalanced line frequency voltage appears across the bridge as indicated by the dash line curve 78 at the zero time point in FIGURE 2. This bridge voltage causes the emitter e of the transistor 50 to be positive with respect to the base b during the same half cycle that the voltage of the transformer coil 30 causes the emitter e of the transistor 50 to be positive with respect to the collector c. This condition permits sufficient current to charge and maintain a voltage across the capacitor 52 to cause a voltage higher than that required by the intrinsic stand off ratio of the transistor 40 to be applied to the emitter e thereof to cause maximum continuous flow of current to the load 20 as indicated by the dot-dash line 80 in FIGURE 2. The solid line 82 indicates the rising temperature within the dash line enclosure 84 in FIGURE 1 which encloses the heater or load 20 and the temperature responsive resistance 74. The horizontal upper portion of the dot-dash curve 80 illustrates the continuous flow of electric energy at the maximum rate through the load 20 until the bridge circuit is substantially balanced at the point indicated by the reference character 86.

At this point, the reduction in bridge voltage is sufficient to cause the transistor 50 to reduce the current flow to the capacitor 52, resulting in a voltage decrease across the capacitor 52 below the intrinsic stand off ratio of the transistor 40, thereby interrupting the flow of current to the load 20. Then, the capacitor 52 is recharged to the intrinsic stand off voltage of the transistor 40 and the emitter to the base b–1 resistance drops abruptly causing a pulse of current through the load 20 having a time duration depending on the capacitance of the capacitor 52 and the resistance of the load 20. These current pulses of equal time duration decreases in frequency as the transistor 50 continues to reduce the charging current to the capacitor 52 which causes a reduction in the average power to the load 20 as indicated by the downwardly extending portion of the curve 80. The dash line 78 indicating the unbalance in voltage of the bridge, continues downwardly to zero, causing the transistor 50 to reduce the charging current of the capacitor 52 to zero, preventing the voltage across the capacitor 52 from rising to the firing voltage of the transistor 40. The load 20 no longer receives power pulses as indicated when curve 80 reduces to zero. The rapid rise of the curve 82 begins to diminish increasingly as the control temperature rises above the desired setting due to the heat stored in the load 20.

During this time, the resistance of the temperature sensor 74 becomes larger than the selected resistance of the variable resistance 70 and the bridge unbalance voltage reverses the time phase, causing the emitter of the transistor 50 to be negative with respect to the base during the same half cycle that the transformer coil 30 causes the emitter to be positive with respect to the collector. This condition reverse biases the transistor 20, and continues to block the flow of current to the capacitor 52 and in turn, the current to the load 20. Due to the absence of heat the temperature within the enclosure 84 begins to decrease as shown by the downward portion of the curve 82. The out-of-phase bridge voltage decreases to zero and starts increasing in the in-phase direction as shown by the rise above zero of the curve 78 to the continuing horizontal portion thereof. This condition again permits current to flow to the capacitor 52 which starts power pulses to the load 20 as indicated by the rise in power of the curve 80 from an OFF condition. The dash line curve 78, indicating the percentage of unbalance of the bridge voltage, continues to rise to a horizontal portion which indicates sufficient unbalance to continue the supply of power to the load 20 at the rate selected by the selected resistance of the variable resistance 70 and the temperature of the temperature sensor 74.

In FIGURE 3 there is shown a circuit arrangement suitable for a domestic oven. In this circuit the supply conductors 122 and 124 connect through a full wave silicon rectifier bridge 106 to the conductors 105 and 104. The conductor 124 also connects to the upper terminal of the input winding 126 of the step down transformer 128. The other terminal on winding 126 connects to the ground 123. The supply conductors 122 and 124 supply standard 236 volt, 60 cycle alternating current which is converted by the full wave bridge 106 to pulsating direct current. The input winding 126 will receive alternating current at 118 volts. The 12 volt output winding 130 of the transformer 128 connects to a similar unijunction transistor circuit having its upper terminal connected through the rectifier 132, the conductor 134 and the rectifier 136 to one terminal of the capacitor 144 and to the base two terminal b–2 of the unijunction transistor 140. The conductor 134 is also connected to the emitter terminal of the transistor 150. The base terminal b of the transistor 150 is connected by the conductor 172 into the bridge circuit in which one leg is formed by a temperature sensor in the form of a temperature responsive resistance 174, the conductor 176 and the 3-volt output winding 158. The opposite leg of the bridge is formed by the variable resistance 170, the conductor 168, the fixed resistance 166 and the 3-volt output winding 156. The center tap 160 between the windings 156 and 158 is connected by the conductor 162 to the conductor 134 to complete the bridge.

The collector terminal c of the transistor 150 is connected through a variable resistance 186 and the conductor 148 to one terminal of the capacitor 152, the other terminal of which connects to the conductor 142 connecting with the lower terminal of the 12 volt output winding 130 as well as to the adjacent side of the capacitor 144. The conductor 148 is also connected by the conductor 146 to the emitter terminal e of the unijunction transistor 140. Instead of the electrical load 20 being connected between the base terminal b–1 and the conductor 42 as in FIGURE 1, there is connected a relay coil 120 between the base one terminal b–1 and the conductor 142. This relay coil 120 is a load which is used to control the gate circuit of the reverse blocking triode thyristor commonly known as a silicon controlled rectifier 185 which in turn controls the large load within the oven compartment 184.

The relay coil 120 when energized, closes a normally open switch 103 connecting the conductor 104 through a resistance 102 with the gate 101 of the silicon controlled rectifier 185. This rectifier 185 has its anode connected to the power bridge output conductor 104 and its cathode connected through the conductor 187 with the lower terminals of the broil and bake electric heaters 112 and 113 within the oven compartment 184. The upper terminal of the heater 112 is connected to a switch 109 which, in the base position connects it with the conductor 105. The upper terminal of the broil heater 113 connects to a double throw switch 111 which in the left bake position connects through the diode reactifier 107 with the ground 110.

When it is desired to bake, the variable resistance 186 has its movable tap moved into contact with the conductor 148 so that its resistance is shunted and only the transistor 150 controls the charging current of the capacitor 152. The variable resistance 170 is moved to a position to select the baking temperature desired with a setting of zero resistance corresponding to the lowest control temperature and maximum resistance corresponding to the highest temperature. If the temperature of the enclosure 184 is lower than the selected temperature, the resistance of the bridge leg composed of the fixed resistor 166 and the variable resistance 170 is larger than the resistance of the temperature sensor 174, there will be caused an unbalance in bridge voltage to be in the proper direction to permit the charging current to flow to the capacitor 152 through the transistor 150. This condition causes the voltage to increase across the capacitor 152 sufficient to cause the unijunction transistor 140 to fire and energize the relay coil 120 to close the switch 103 to cause the silicon controlled rectifier 185 to conduct full power to the broil heater 113 and the bake heater 112 until the temperature responsive resistance 174 substantially reaches the selected temperature. At that temperature, the transistor 150 will reduce the charging current to the capacitor 152 below the amount required to maintain the firing voltage of the transistor 140 causing the emitter to base $b-1$ circuit of the unijunction transistor 140 to revert to a high resistance stopping the current through the relay coil 120 to the conductor 142. The de-energization of the relay coil 120 will open the switch 103 to disconnect the gate 101 of the silicon controlled rectifier 185 from the supply conductor 104. This will stop the silicon controlled rectifier from conducting at the next null point in the rectified current supply to stop conduction to the electric heaters 112 and 113.

As the temperature continues to increase toward the exact temperature setting, the charging current to the capacitor 152 reduces sufficiently to cause pulsing of the unijunction transistor 140 and the closing and opening of the relay switch 103 sufficient to cause the silicon control rectifier to conduct power pulses of equal time duration to the heaters 112 and 113 at a decreasing frequency. The temperature continues to increase to the exact setting and above, corresponding to temperatures above the horizontal portion of the curve 82, FIGURE 2, causing the transistor 150 to reduce to zero the charging current to the capacitor 152 preventing the unijunction transistor 140 from firing thereby preventing the silicon controlled rectifier 185 from conducting and reducing to zero the average power to the heaters 112 and 113 as illustrated by the fall to zero of the curve 80 in FIGURE 2.

When the temperature within the oven compartment 184 falls, the bridge circuit will again become unbalanced in the proper direction a small amount corresponding to the horizontal portions of the dash line 78 in FIGURE 2. This will permit conduction of the transistor 150 a small amount sufficient to cause pulsing of the unijunction transistor 140 and the closing and opening of the relay switch 103 sufficient to cause the silicon controlled rectifier 185 to supply enough energy to the heaters 112 and 113 to maintain the selected temperature within the oven compartment 184. The heater 112 will normally be located in the lower part of the oven and will be energized at full voltage while the heater 113 will normally be located in the upper portion of the oven and energized at half full voltage by being connected between the conductor 187 and the ground to provide one-fourth its maximum heat during baking.

For broiling, the switch 109 is opened and the switch 111 is moved to the right to engage the conductor 108. These switches 109 and 111 may be operated simultaneously through the interconnection 189. For broiling, the variable resistance 170 is moved to a maximum resistance position providing a temperature limit for a high oven temperature while the variable resistance 186 has its tap moved to an intermediate position thereon so as to select the desired ON and OFF cycling of the switch 103 and the silicon controlled rectifier 185 to energize intermittently the broil heater 113 at the full voltage for the desired proportion of time for the particular broiling desired. If desired, the movable taps of the variable resistances 170 and 186 may be interconnected by the connection 191 so that they will be adjusted simultaneously for broiling and baking.

In FIGURE 4 there is illustrated a bridge temperature sensing circuit which controls a transistor 150 and the unijunction transistor 140 in a manner similar to that illustrated in FIGURE 3 to control the operating coil 120 of a similar relay. The oven compartment 184 contains similar oven heaters 112 and 113 and similar switches 111 and 109. However, in this circuit no rectifier bridge is provided and the supply conductor L–1 not only supplies the input winding 126 of the transformer 128, but also connects directly to the switches 111 and 109 in the same manner as the conductor 105 in FIGURE 3. The corresponding parts of this circuit bear the same reference character as the corresponding parts of FIGURE 3. This circuit differs in that the coil 120 operates a double pole switch provided with normally open contacts 203 and 204. These contacts provide a connection between a supply conductor L–2 through a limiting resistance 201 and 202 to conductors 193 and 195 connecting with the gates of two bidirectional triode thyristors commonly known as triacs 197 and 199. The triac or thyristor 197 has its two anode terminals connecting the supply conductor L–2 with the lower terminal of the bake electric heater 112. The triac thyristor 199 has its two anode terminals connecting with the supply conductor L–2 with the terminal of the broil heater 113.

When the variable resistances 170 and 186 are set at the proper values for baking and the switches 109 and 111 are in the bake position, the bridge circuit will be unbalanced initially to cause the relay coil 120 to be energized and close the switches 203 and 204 to provide a controlled flow of energy to the gate terminals of the triac thyristors 197 and 199 sufficient to cause them to fire and conduct full alternating current voltage through the bake heater 112 and one-half full alternating current voltage providing one-quarter maximum wattage to the upper broil heater 113. The currents and control conditions will be similar to that illustrated in FIGURE 2. The electromagnet coil 120 will be energized intermittently at a slow enough rate to minimize radio interference in a proper proportion to reduce the heating rate of the heaters 112 and 113 as the selected temperature is approached within the oven compartment as measured by the temperature sensor in the form of a temperature responsive resistance 174 to minimize over-shooting and bring the oven to the desired temperature and maintaining it substantially at that temperature.

For broiling, the switches 109 and 111 are moved to the right to disconnect the heater 112 and to connect the heater 113 to the branch conductor 108. The variable resistance 170 and 186 are adjusted to the proper broil position as previously explained and the relay coil 120 is energized intermittently at a slow enough rate to minimize radio interference and in sufficient proportions to maintain the heater 113 at the desired broiling temperature.

In FIGURE 5, the supply conductor L–1 is similarly connected to the transformer 128 and to the switches 109 and 111 controlling the oven heaters 112 and 113. The output windings 130, 156, 158 of the transformer 128 are similarly connected to the temperature responsive resistance 174, the fixed resistance 166, the variable resistances 170 and 186, the transistors 150 and 140 as well as the capacitors 144 and 152. However, in the FIG- URE 5, instead of the relay coil 120 there is a fixed current limiting resistance 118 connected between the terminal B–1 of the unijunction transistor 140 and the gate of the reverse blocking triode thyristor commonly known as a silicon controlled rectifier 119. The cathode of the silicon controlled rectifier 119 is connected to the conductor 142 while the anode is connected by a conductor 194 with the hot wire actuators 116 and 117 which, when energized, close the hot wire relay switches 114 and 115 connecting the supply conductor L–2 with the lower terminals of the heaters 112 and 113. With this arrangement the firing of the unijunction transistor 140 is controlled in the manner previously explained for both baking and broiling. The firing of the transistor 140 applies a voltage to the gate of the silicon controlled rectifier 119 sufficient to cause it to conduct and to energize the operating bimetals 116 and 117 to close the switches 114 and 115 to cause the energization of the heaters 112 and 113 when the switches 109 and 111 are set in the bake position and the broil heater 113 alone when the switches 109 and 111 are set in the broil position. The hot wire actuators 116 and 117 will operate at a low enough frequency to minimize radio interference. They will close the switches 114 and 115 in the proper portion of time in either the bake or broil arrangement to rapidly attain and accurately maintain the desired baking or broiling temperatures.

In FIGURE 6 the supply conductor 124 connects to the input winding 126 of the transformer 128. Both supply conductors 122 and 124 connect to the full wave silicon rectifier bridge 106 and the conductors 105 and 104 are connected to the pulsating direct current output of the bridge in a manner similar to that illustrated in FIGURE 3. The 12-volt output winding is divided by a center tap connecting with the conductor 142 to provide a rectified full wave supply from the sections 130A and 130B through the diode rectifiers 132A and 132B and the conductor 134 and the diode rectifier 136 to the unijunction transistor 140 as well as to the transistor 150. The output windings 156 and 158 each supply three volts A.C. to the temperature responsive bridge including the temperature sensor in the form of the temperature responsive resistance 174, the variable resistance 170, the fixed resistance 166, all of which are similar to those described in the previous figures with the reference characters being applied to similar parts. This circuit however differs from the circuit shown in FIGURE 5 in that the base electrode b–1 of the transistor 140 is connected through the fixed resistance 118 to the base of a transistor 320. This fixed resistance 118 and the transistor 320 constitute the electrical load of the unijunction transistor 140. This transistor 320 has its emitter connected to the conductor 142 and its collector connected through the input transformer winding 322 to the conductor 134. The winding 322 forms a part of the transformer 324 having one terminal of its output winding 19 connected to the conductor 330 while the other terminal is connected through a diode rectifier 326 to the gate of a reverse blocking triode thyristor commonly known as a silicon controlled rectifier 328. This silicon controlled rectifier has its anode connected to the supply conductor 104 and its cathode connected to the conductor 330 connecting with the lower terminal of the electric heater 332 within an oven compartment 334 or other space to be heated which also contains the temperature responsive resistance 174. The other terminal of the heater 332 connects to the conductor 105.

With this arrangement, when the temperature responsive resistance 174 is smaller than the resistance of the variable resistance 170, the transistor 150 will conduct and cause the unijunction transistor 140 to fire and through the fixed resistance 118 will apply pulses of direct current to the base of the transistor 320 permitting full wave direct current to flow through the winding 322 of the transformer 324 which causes the transformer 324 to apply an inverted full wave voltage to the gate of the silicon controlled rectifier 328 to cause it to start conducting at the beginning of each cycle permitting current flow through the heater 332. As the bridge circuit approaches balance the transistor 150 will conduct less and apply pulses of equal time duration more slowly to the emitter of the unijunction. The transistor 140 will fire less frequently and cause the transistor 320 to conduct less frequently so that the frequency of the full wave voltage pulses applied to the transformer winding 322 will be lower and in turn reduce the frequency of the inverted full wave voltage pulses applied to the gate of the silicon controlled rectifier 328 to reduce the average current flow through the heater 332 as the selected temperature is approached within the oven 334. The diode rectifier 326 is optional and may be omitted if desired.

The circuit in FIGURE 7, like FIGURE 6 employs all solid state components. In this circuit the supply conductor L–1 connects with the upper terminal of the transformer input winding 126 having its lower terminal connected to the ground 123. The supply conductor L–1, like FIGURE 5 connects through the switches 111 and 109 with the broil and bake heaters 113 and 112 in the oven 184. The transformer 128 through its tapped output coil including the sections 130–A and 130–B, supplies full wave rectified current through the diodes 132A and 132B and through the diode 136 to the base terminal b–2 of the unijunction transistor 440. The other base terminal b–1 is connected through the current limiting resistance 441 and 443 with the conductor 442 connecting to the tap between the output windings 130–A and 130–B.

The transformer 128 has a second set of output windings 156 and 158 provided with a center tap 160. The upper terminal of the winding 156 together with a calibrating variable resistance 466 and a temperature selecting variable resistance 470 form one leg of the bridge circuit, while the other leg is formed by the connection of the lower terminal of the other output winding 158 with an ambient temperature responsive compensating resistance 469 connecting through the conductor 476 with the temperature sensor in the form of the temperature responsive resistance 174. The center tap 160 is connected through the conductor 162 with the upper terminal of the output winding 130–A and by the conductor 462 with the emitter terminal of the transistor 450. The base terminal of the transistor 450 is connected by the conductor 451 to the connection between the customer controlled variable resistance 470 and the temperature responsive resistance 174 in the oven 184. The emitter and the base terminals of the transistor 450 are therefore connected across the bridge.

The collector of the transistor 450 is connected through the diode 449 with the one terminal of the capacitor 152 having its other terminal connected to the conductor 442. The diode 449 is also connected to the emitter terminal of the unijunction transistor 440.

When the bridge circuit is unbalanced in the proper direction, the voltage applied to the transistor 450 will cause it to conduct and supply pulses of half wave current through the diode 449 to charge the capacitor 152 sufficiently to apply a voltage to the emitter of the unijunction transistor 440 to cause it to conduct current to its load comprising the current limiting resistances 441 and 443 and the gate of the reverse blocking triode thyristor commonly known as a silicon controlled rectifier 453. This applies a voltage to the gate of the silicone controlled rectifier 453 having its cathode connected to conductor 442 and its anode connected to the lower terminal of the input transformer winding 419. The upper terminal of the transformer 419 is connected by the conductor 418 to the rectifiers 132–A and 132–B which rectify the output of the windings 130–A and 130–B. Connected across the terminals of the input winding 419 is a diode 417 which shunts any induced voltages in the input coil 419 of the transformer 416. This allows the anode current of the silicon controlled rectifier to reduce to zero at the null points of the voltage curve as illustrated in FIGURE 9 and permit control.

The transformer 416 has four output windings, 455, 457, 459, and 461, each of which have inverted connections with the silicon controlled rectifier to which they are connected. That is, the output windings are connected to the silicon controlled rectifier gate circuits in a manner which permits low voltage spikes to cause the gates to be positive with respect to the cathodes just prior to the instant that the anodes become positive with respect to the cathodes. These windings each apply an inverted full wave gate to cathode voltage to one of the silicon controlled rectifiers 456, 458, 460 and 463 which are oriented in opposite directions so as to permit alternating current to flow through the broil and bake electric heaters 113 and 112 in the oven 184. The coil 455 has its upper terminal connected by the conductor 465 to the cathode of the silicon controlled rectifier 456 and also is connected to the conductor 467 connecting to the lower terminal of the broil heater 113. This conductor 467 also connects with the anode of the oppositely oriented silicon controlled rectifier 458. The lower terminal of the winding 455 connects with the gate of the rectifier 456. The winding 457 has its upper terminal connected to the gate of the silicon controlled rectifier 458 and its lower terminal connected to the conductor 477 connecting with the supply conductor L–2. The winding 459 has its upper terminal connected by the conductor 479 to the conductor 481 connecting the lower terminal of the bake electric heater 112 with the cathode of the silicon controlled rectifier 460 and with the anode of the silicon controlled rectifier 463. The lower terminal of the winding 459 connects to the gate of the silicon controlled rectifier 460. The upper terminal of the winding 461 connects to the gate of the silicon controlled rectifier 463 while the lower terminal of this winding connects to the conductors 477, 483 and 485 which connect with the lower terminals of the silicon controlled rectifiers and the supply conductor L–2.

When the unijunction transistor 440 fires, it imposes a voltage upon the gate of the silicon controlled rectifier 453 causing it to conduct and permit full wave direct current flow through the transformer winding 419 which is synchronized with the voltage applied by the supply conductors L–1 and L–2. The voltage curve of the supply conductors L–1 and L–2 relative to the ground 123 is illustrated in FIGURE 8. The rectified voltage applied to the input transformer winding 419 is synchronized with the supply voltage in FIGURE 8 by the natural conditions of the circuit so that the null points are substantially aligned at all times. The output windings 455, 457, 459 and 461 are connected in a manner which applies low voltage spikes of inverted full wave to the gate to cathode circuits of the silicon controlled rectifiers 456, 458, 460 and 463, as illustrated in FIGURES 10 and 11. Since the input to the transformer coil 419 is rectified as illustrated by the curve in FIGURE 9, the voltage transfer ratio of transformer 119 is very poor so that the voltage at the peaks of spikes 487 and 489 is relatively low, such as one and one-half volts, because of the large proportion of direct current input together with a relatively small portion of alternating current input. This arrangement results in the peaks 487 and 489, FIGURES 10 and 11, occurring substantially at the null points of the input voltage thereby assuring the application of the low voltage peaks 487 and 489 to the gates of the silicon controlled rectifiers 456, 458, 460 and 463 substantially at the null points of the supply voltage and immediately prior to the time that their anodes become positive. This assures that the circuit will have no radio interference.

Thus, whenever the bridge circuit is unbalanced in the proper direction and imposes a sufficient emitter to base voltage upon the transistor 450, it will conduct half wave pulses of current to the capacitor 152. Whenever the capacitor 152 becomes sufficiently charged, it will discharge through the emitter e of the unijunction transistor 440 and the current limiting resistance 441 to the gate of the silicon controlled rectifier 453. This silicon controlled rectifier 453 will fire to energize the transformer winding 419, as indicated in FIGURE 9, and through the transformer action of the transformer 416 to generate the full wave voltage in the windings 455, 457, 459 and 461 to apply the low wattage spikes of inverted full wave voltage, illustrated in FIGURES 10 and 11, to the gates of the silicon controlled rectifiers 456, 458, 460 and 463. This will cause these rectifiers to fire substantially at the null points immediately prior to the time when the anodes become positive to provide for full alternating current flow through the silicon controlled rectifiers 460 and 463 for the bake element 112 and through the silicon controlled rectifiers 456 and 458 for the broil element 113. Bake and broil elements 112 and 113 are connected in the circuit as determined by the switches 109 and 111. As the bridge approaches balance, the charging current flow to the capacitor 152 is reduced causing the unijunction transistor to pulse at a decreasing frequency and in turn reduce the frequency of the power pulses to the bake and broil heaters 112 and 113.

When the bridge circuit becomes substantially balanced by the temperature responsive resistance attaining a resistance substantially equal to the adjusted resistance of the resistance 470, the transistor 450 will cease conducting and current flow to capacitor 152 will reduce to zero, causing the unijunction transistor 440 and the silicon controlled rectifier 453 to cease firing so that the transformer winding 419 will no longer receive current. This will prevent the application of voltage pulses to the gates of the silicon controlled rectifiers 456, 458, 460 and 463 so that they will cease conducting upon the next null point in the voltage applied by the supply conductors L–1 and L–2 as illustrated in FIGURE 8. This system therefore provides the application full alternating current to the heaters 112 and 113 continuously at maximum wattage until the temperature within the oven 184 approaches the temperature selected by the variable resistor 470. This will be similar to the curve 82 in FIGURE 2 and the voltage applied to the transistor 450 will be similar to that as shown by the dash curve in FIGURE 2. The output of the unijunction transistor 440 and the silicon controlled rectifiers will be similar to that of the dot-dash curve 80 in FIGURE 2. This assures rapid approach to the temperature selected with a minimum overshoot as well as accurate maintenance thereafter of the selected temperature. A broil control may be incorporated in the circuits of FIGURES 6 and 7 in a manner similar to the circuits of FIGURES 3, 4, and 5.

While the embodiments of the present invention as herein disclosed, constitute preferred forms, it is to be understood that other forms might be adopted.

What is claimed is as follows:

1. An electrical control system including a unijunction transistor having two base terminals and an emitter terminal, an electrical load electrically connected in series with one of said base terminals, a first capacitor electrically connected in shunt circuit shunting said transistor and said load, a second capacitor electrically connected to said emitter terminal and said load, means comprising two conductors electrically connected to opposite terminals of said first capacitor for charging said capacitors and energizing said load and transistor, and means for varying the current flow between the other of said base terminals and said emitter terminal.

2. A control system as defined in claim 1 in which said last named means includes a variable resistance.

3. A control system as defined in claim 1 in which said last named means includes a temperature responsive circuit.

4. A control system as defined in claim 1 in which said last named means includes a bridge circuit comprising a variable resistance and a temperature responsive resistance.

5. A control system as defined in claim 1 in which said last named means includes a three element electron control device having one element electrically connected to said emitter terminal and another element electrically connected to one of said base terminals.

6. A control system as defined in claim 1 in which said last named means includes a three element electron control device having one element electrically connected to said emitter terminal and another element electrically connected to one of said base terminals and having a third element, and means for applying a variable voltage across said third element and one of the other elements of said electron control device.

7. A control system as defined in claim 1 in which said last named means includes a temperature responsive circuit containing a temperature sensor, a heater, said electrical load having means for controlling said heater, a medium heated by said heater, said sensor being located in heat transfer with said medium.

8. A control system as defined in claim 1 in which the electrical load is in the form of an electrical control device.

9. A control system as defined in claim 1 in which the electrical load is in the form of a thyristor.

References Cited

UNITED STATES PATENTS

| | | | |
|---|---|---|---|
| 3,136,877 | 6/1964 | Heller | 219—499 |
| 3,243,609 | 3/1966 | Kompelien | 219—501 |
| 3,275,802 | 9/1966 | Vandivere et al. | 219—504 X |
| 3,299,344 | 1/1967 | Werts | 219—504 X |
| 3,299,345 | 1/1967 | Werts | 219—504 X |
| 3,299,346 | 1/1967 | Gambill | 219—504 X |

BERNARD A. GILHEANY, *Primary Examiner.*

H. B. GILSON, *Assistant Examiner.*